US008449650B2

(12) United States Patent  (10) Patent No.: US 8,449,650 B2
Currier et al.  (45) Date of Patent: May 28, 2013

(54) GAS STORAGE AND SEPARATION BY ELECTRIC FIELD SWING ADSORPTION

(75) Inventors: Robert P. Currier, Santa Fe, NM (US); Stephen J. Obrey, Los Alamos, NM (US); David J. Devlin, Santa Fe, NM (US); Jose Maria Sansinena, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 403 days.

(21) Appl. No.: 12/816,182

(22) Filed: Jun. 15, 2010

(65) Prior Publication Data

US 2010/0319534 A1  Dec. 23, 2010

Related U.S. Application Data

(60) Provisional application No. 61/187,853, filed on Jun. 17, 2009.

(51) Int. Cl.
*B01D 53/04* (2006.01)
*B03C 3/155* (2006.01)

(52) U.S. Cl.
USPC ............... 95/45; 95/81; 95/96; 95/114; 96/4; 96/68; 96/99

(58) Field of Classification Search
USPC .............. 95/45, 80, 81, 96, 114; 96/4, 68, 96/99
See application file for complete search history.

(56) References Cited

U.S. PATENT DOCUMENTS

| | | | |
|---|---|---|---|
| 4,816,121 A * | 3/1989 | Keefer | 204/156 |
| 5,133,844 A | 7/1992 | Stevens | |
| 5,858,065 A * | 1/1999 | Li et al. | 95/45 |
| 6,514,317 B2 | 2/2003 | Hirano et al. | |
| 6,585,809 B1 | 7/2003 | Parsa | |
| 6,929,679 B2 | 8/2005 | Muller et al. | |
| 6,930,193 B2 | 8/2005 | Yaghi et al. | |
| 7,121,276 B2 * | 10/2006 | Jagger et al. | 128/201.21 |
| 7,309,380 B2 | 12/2007 | Muller et al. | |
| 7,343,747 B2 | 3/2008 | Muller et al. | |
| 2006/0287190 A1 | 12/2006 | Eddaoudi et al. | |
| 2007/0248852 A1 | 10/2007 | Mueller et al. | |
| 2008/0121105 A1 | 5/2008 | Schubert et al. | |
| 2010/0043633 A1 * | 2/2010 | Galbraith | 95/68 |

OTHER PUBLICATIONS

Li et al, "Design and Synthesis of an Exceptionally Stable and Highly Porous Metal-Organic Framework", Nature, vol. 402, Nov. 1999, pp. 276-279.
Blomqvist et al., "Li-decorated Metal-Organic Framework 5: A Route to Achieving a Suitable Hydrogen Storage Medium", PNAS, vol. 104, No. 51, Dec. 2007, pp. 2073-20176.

* cited by examiner

*Primary Examiner* — Richard L Chiesa
(74) *Attorney, Agent, or Firm* — Samuel L. Borkowsky

(57) ABSTRACT

Gases are stored, separated, and/or concentrated. An electric field is applied across a porous dielectric adsorbent material. A gas component from a gas mixture may be selectively separated inside the energized dielectric. Gas is stored in the energized dielectric for as long as the dielectric is energized. The energized dielectric selectively separates, or concentrates, a gas component of the gas mixture. When the potential is removed, gas from inside the dielectric is released.

14 Claims, 1 Drawing Sheet

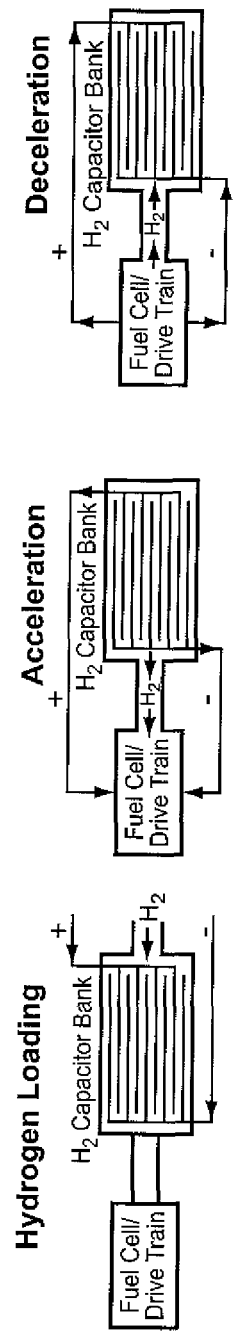

GAS STORAGE AND SEPARATION BY ELECTRIC FIELD SWING ADSORPTION

RELATED APPLICATIONS

This application claims the benefit of U.S. provisional patent application No. 61/187,853 entitled "Gas Storage and Separation by Electric Field Swing Adsorption," filed Jun. 17, 2009, hereby incorporated by reference.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to gas storage, separation, and concentration by exposing gas to a porous dielectric adsorbent material while applying an electric field across the adsorbent.

BACKGROUND OF THE INVENTION

Gas is stored by compression and containment, by reversible adsorption into suitable storage materials, and/or by reversible chemical reactions that produce molecular compounds in one reaction direction and liberate gas in another direction. Gas separation is based typically on temperature swing adsorption, pressure swing adsorption, and/or chemical or physical scrubbing. These techniques may also be used for facilitating gas storage or concentration of a gas.

Temperature swing adsorption involves exposing a feed gas mixture (gases A and B) to an adsorbent bed. If gas "A" is selectively or preferentially adsorbed on the bed, the result is a gas blend enriched in gas B and depleted in gas A. When the adsorbent bed reaches full capacity for gas A, the feed gas mixture of gases A and B is diverted and the adsorbent bed is sealed off and heated, which liberates the adsorbed gas that is enriched in gas A. After liberating the adsorbed gas, the bed is cooled down and exposed again to the feed gas mixture. In a large scale industrial application, two or more adsorbent beds are typically used in tandem, leading to a continuous separation process. For an even more complete separation, beds can be staged in series such that gas liberated from one bed is the feed gas for another bed. Electric swing adsorption is a form of temperature swing adsorption where electricity is used to resistively heat the adsorbent bed to induce the thermal release of adsorbed material.

Pressure swing adsorption involves exposing an adsorbent bed to a high pressure gas to promote selective capture of one or more components of the gas by the bed. The bed can be regenerated by reducing the pressure to induce gas desorption from the bed.

Selective gas separation by chemical or physical scrubbing involves preferential uptake of one or more component(s) of a gas stream into a solution that functions as an adsorbent. The solution may rely on physical interactions with the gas, such as solubility, and/or may rely on chemical reaction between a gas and the solution. The gas-loaded solution is then typically heated (sometimes with a lowering of the pressure) to reverse the adsorption process and yield a gas enriched in specific components.

Gas separations and gas concentration are also performed by selective condensation of heavier components by compression and cooling. Membranes and clathrate inclusion compounds have also been used for gas separation.

Adsorbents used in gas separation methods based on physical adsorption, such as temperature and pressure swing adsorption, are varied. Adsorbents include activated charcoal, graphite, carbon nanotubes, and other allotropes of carbon. Natural and synthetically-modified minerals (e.g. zeolites or silica), polymers, and/or gels can also be used as absorbents.

More recently, Metal-Organic Frameworks (MOFs) which are porous and have a high surface area (up to 5000 $m^2/g$) have been employed as adsorbents. Much of the interest in MOFs is due to their ability to stabilize hydrogen ("$H_2$") at liquid nitrogen temperatures. For example, one well-studied MOF structure known in the art as MOF-5 (see: Li et al., "Design and Synthesis of an Exceptionally Stable and Highly Porous Metal-Organic Framework," Nature, volume 402, November 1999, pp. 276-279, incorporated by reference herein) can store up to 11 weight percent $H_2$ at sub-atmospheric pressure at 30 K. Hydrogen is of considerable interest due to its potential use as a clean fuel for electric power production and in fuel cells for automotive applications. However, separation and storage of $H_2$ remains a challenge due at least in part to its high mobility and also to the weak forces between $H_2$ molecules. Enhanced, cost effective adsorbents are also needed for other important separations such as the capture of the greenhouse gas carbon dioxide from low pressure flue gas mixtures.

Energy efficiency, capital investment, and operating costs are all important factors to consider when putting a gas separation or storage technique into practice. Many absorbents suffer from low gas loading on a weight percentage basis. Energy is consumed during the adsorption/desorption cycle. Gas storage and separation using chemical reactions or clathrate-hydrate inclusion compounds are often energy intensive due to large heats of reaction or heats of formation. Likewise, regeneration of scrubbing solutions often requires significant quantities of heat.

SUMMARY OF THE INVENTION

In accordance with the purposes of the present invention, as embodied and broadly described herein, the invention includes a method for adsorbing gas that involves (i) preparing an apparatus comprising a porous dielectric in between and in electrical communication with a first electrical conductor and a second electrical conductor, and (ii) applying an electric field across the porous dielectric adsorbent material, and (iii) sending gas into the porous dielectric adsorbent material, thereby adsorbing or storing gas in the porous dielectric adsorbent material.

The invention also includes a method for selectively separating a gas from a mixture of gases. The method involves (i) exposing a mixture of gases to an apparatus that comprises a porous dielectric adsorbent material in between and in electrical communication with a first electrical conductor sheet and a second electrical conductor, (ii) allowing the mixture of gases to diffuse into the porous dielectric adsorbent material, and (iii) applying a voltage between the first electrical conductor and the second electrical conductor, thereby creating an electric field across the porous dielectric adsorbent material, whereby selective separation of a gas from the mixture of gases occurs.

The invention also includes a method for enhancing the gas storage capacity of a porous dielectric material. The method involves (i) exposing a porous dielectric adsorbent material to a gas, and (ii) applying an electric field across the porous dielectric adsorbent material, thereby enhancing the gas storage capacity of the porous dielectric adsorbent material.

BRIEF DESCRIPTION OF THE DRAWING

The accompanying drawings, which are incorporated in and form a part of the specification, illustrate the embodiments of the present invention and, together with the description, serve to explain the principles of the invention. In the drawings:

FIG. 1 shows how hydrogen storage and release according to an embodiment of the invention that may be applied to on-board hydrogen storage in a vehicle.

DETAILED DESCRIPTION

Some aspects of the invention relate to gas storage using devices having a porous dielectric material in between electrically conductive components (planar sheets, concentric cylinders, spheres, or other geometries). The electrically conductive components are used to provide an electric field across the dielectric material. Other aspects of the invention relate to using these devices for separating a gas from a gas mixture. Yet other aspects of the invention are for concentrating a particular gas component in a gas stream. The invention is applicable to the collection and concentration of trace or low concentration volatile organic and inorganic chemicals, and may be applied in tandem with devices that are designed to detect and/or identify the chemicals.

A device useful for the gas storage, separation, and/or concentration was constructed was constructed using a porous metal-organic framework ("MOF") known in the art as MOF-5. MOFs are crystalline compounds consisting of metal ions or clusters coordinated to often rigid organic molecules to form one-dimensional, two-dimensional, and three-dimensional structures that can be porous. MOFs are known in the art by alternative names for different subclasses of MOFs such as ZIF, IRMOF, HKU, and the like, and all of these are considered to be MOFs all within the scope of this invention. Other MOFs have been described as materials for gas storage in the following paper and US patents all of which are incorporated by reference herein: Müller et al. in U.S. Pat. No. 6,929,679 entitled "Method of Storing, Uptaking, Releasing of Gases by Novel Framework Materials," issued Aug. 16, 2005; Yaghi et al. in U.S. Pat. No. 6,930,193 entitled Isoreticular Metal-Organic Frameworks, Process for Forming the Same, and Systematic Design of Pore Size and Functionality Therein with Application for Gas Storage," issued Aug. 16, 2005; Blomqvist et al. in "Li-Decorated Metal-Organic Framework 5: A Route to Achieving a Suitable Hydrogen Storage Medium, PNAS, volume 104, number 51, December 2007, pp. 20173-20176; and Müller et al. in "Gas Storage System," issued Dec. 18, 2007.

In an embodiment, MOF-5 was sandwiched in between two sheets of copper and a voltage is applied to the copper sheets with gas inside the MOF-5. This structure of MOF-5 sandwiched in between the copper sheets is representative of a capacitor, which is generally described as two electrodes of electrically conductive materials separated by, and in contact with, a dielectric material. The dielectric material in this embodiment is the MOF-5.

It should be understood that the capacitor-like structure may include parallel plate structures or nonparallel structures including a concentric cylinder structure, a spherical structure, or another geometric structure. In any of these structures, the conductive plates, cylinders, spheres, etc. are separated by the dielectric material between the conductive materials.

Suitable porous dielectric adsorbent materials are any solid state material that is not electrically conductive and shows a change in physicochemical and/or electronic properties upon application of an electric field. Such dielectric materials typically are non-conductor solid state materials that behave as insulators or semiconductors. The dielectric material should have surface features that permit physi-sorption or chemisorption of molecules to the surface of the dielectric material. The surface area is indicative of how much can be adsorbed per unit mass or per unit volume. Typical surface areas of the dielectric materials useful with this invention typically can range from 1 $m^2$/gram to 5000 $m^2$/g, but also can be as high as 10,000 $m^2$/gram.

Besides MOF-5, other adsorbents are useful with this invention. Some of these include silica, alumina, Celite, zeolites such as but not limited to ZSM-5, MCM-22, AET, and ATT (for zeolite purification of a hydrogen based gas mixture, see for example Hirano et al. in U.S. Pat. No. 6,514,317 entitled "Method of Purifying Hydrogen-Based Gas Mixture, which issued Feb. 4, 2003; for example). Clay adsorbents such as but not limited to bentoite, attapulgite, paltgorskite, or montmorillonite are also useful. Dielectric materials of semiconductors and insulators useful with this invention include those derived from alkali metals, alkaline earth metals, transition metals, main group and lanthanide metals combined with suitable materials such as oxides, sulfides, selenides, tellurides, nitrides, phosphides, arsenide, antimonide, and carbide. Other types of adsorbents useful with the invention include hybrid material composites that include a metallic or semiconducting material held together with a nonconducting matrix material. An example of such a hybrid is a combination of semiconductive silicon or germanium particles in a nonconductive silicon dioxide matrix. Another example of such a hybrid includes quantum dots (of CdSe, for example) in a porous, solid state matrix of alumina. Yet another example of such a hybrid includes nanoscale or microscale particles of silver or some other conductive metal in an aerogel matrix. Still another example of a hybrid material includes magnetic particles such as magnetite ($Fe_3O_4$) in a matrix of a zeolite.

MOF materials can be modified with ligands to provide other useful adsorbents. Ligands including heteroatoms such as heteroatoms such as silicon, germanium, tin, lead, nitrogen, phosphorus, antimony, arsenic, oxygen, sulfur, selenium, tellurium, boron, fluorine, chlorine, bromine, or iodine, for example, may be used to modify the MOF material. Some examples of heteroatoms-containing ligands useful for modifying the MOF are pyridines, bipyridines, pyrazine, tetrazole, furans, pyrrole, imidazole, trithiane, and cyclophosphazines.

Coordination of main group, transition metals such as iron or molybdenum, and/or lanthanide metals to these ligands can be used to influence the response of the porous dielectric adsorbent material while an electric field is applied across the porous dielectric adsorbent material. Any element from the periodic table groups 2, 3, 4, 5, 6 that can coordinate or bond to a ligand or heteroatoms can be bound in order to influence the electric field swing adsorption process.

Electric fields are applied to the porous dielectric adsorbent material with potentials greater than 0 volts up to the dielectric breakdown of the porous dielectric adsorbent material used for the gas storage, separation and concentration. Dielectric breakdown can be very low in the case of hybrid materials containing metallic or semiconducting materials and very high in the case of fluorocarbon-based materials that can have a dielectric breakdown exceeding $1 \times 10^6$ volts/meter.

An optimal applied voltage is the electric potential for inducing a physicochemical and/or electronic change in properties of the porous dielectric adsorbent material that induces a change in the adsorption and desorption of a desired analyte.

Gases that can be separated include any molecular mixture wherein one of more the gaseous components of the mixture shows a differential response to the applied electric field or shows a differential interaction with the porous dielectric adsorbent material when an electric field is applied across the material. These gases may include molecules with differences in their dipole moments, or any other higher order moment that could be attributed to a quadrupole or other higher order multipole moments or induced electrostatic moments. Electric field swing adsorption is applicable for separation of helium, neon, argon, krypton, xenon, fluorine, chlorine, bromine, hydrogen, sulfur dioxide, hydrogen sulfide, ammonia, carbon dioxide, carbon monoxide, nitrogen, oxygen, fluorocarbons, chlorocarbons, chlorofluorocarbons, alcohols, ketones, esters, ethers, and hydrocarbons such as aromatic hydrocarbons and aliphatic hydrocarbons (methane, for example), or any potentially volatile molecule that has been amenable to capture in traditional adsorbent materials or MOF materials from multi-component gas streams. These separations may occur in a binary, ternary, quaternary, or any higher number of component mixtures.

Examples of gases that can be stored using the invention include helium, neon, argon, krypton, xenon, fluorine, chlorine, bromine, hydrogen, sulfur dioxide, hydrogen sulfide, carbon dioxide, and methane. These gases may be introduced as pure feed gases or as binary, ternary, quaternary, or any other mixture containing a higher number of components.

For the embodiment of MOF-5 sandwiched in between two copper sheets, an electrical potential was applied between the copper sheets which resulted in an applied electric field across the MOF-5 in between the copper sheets. During application of the electric field, the device was exposed to a gas mixture of 10% $CO_2$, 10% $O_2$, and 80% nitrogen. The result was that the $CO_2$ was selectively pulled into the MOF-5, even when the applied electrical potential between the two copper sheets was as low as 100 volts. When the applied potential was removed, the $CO_2$ was released from the MOF-5, demonstrating an enhanced, yet reversible, adsorption of $CO_2$ by MOF-5. The uptake of the $CO_2$ when the device was energized was measured. Unexpectedly, the concentration of $CO_2$ adsorbed within the energized MOF-5 was five times the concentration found in the MOF-5 in the absence of the applied electric field. These results also demonstrated an enhancement in gas storage in the porous dielectric adsorbent material MOF-5 when an electrical field was applied across the MOF-5.

Modulating the electric field strength by adjusting the applied voltage during gas loading and unloading should allow direct control of gas uptake and release.

Without wishing to be bound by any particular theory or explanation, it is believed that the application of the electric field across the porous dielectric results in an increase in electrostatic binding forces between the porous dielectric adsorbent material and the gas molecules within this material. The relative enhancement in binding is different for different gases. There is believed to be a physical basis for preferential binding of one gas with the porous dielectric adsorbent material compared to that for another gas. It is believed that he interaction between the gas and porous dielectric adsorbent material is believed to be strongest at localized regions of high polarizability that enhance gas binding at those sites in the porous dielectric. Binding may be enhanced through both induction and dispersion forces. The applied field may also enhance binding interactions among the gas molecules themselves. For example, if the gas is hydrogen, application of the electric field may enhance the formation of hydrogen clusters in the dielectric by increasing dispersion and quadrupole-quadrupole interactions among the hydrogen molecules. When the applied electric field is removed, the induced electrostatic moment that stabilizes the gas dissipates. Thus, the thermodynamic driving force for binding can be switched on and off. As a result, the uptake/release dynamics do not depend only on thermal diffusion because much of the energy for binding and releasing the gas is reversibly (or near reversibly) introduced in the form of electrical work. FIG. 1 highlights an embodiment device as it might be applied to on-board hydrogen storage in vehicles. At the left of FIG. 1 is shown hydrogen loading, in the center is shown acceleration, and deceleration is shown at the right. The diagrams show the electrical charging and resulting hydrogen flow in and out of a storage capacitor. Operationally, the system is similar to regenerative braking in a hybrid automobile. Hydrogen loading (shown at the left) involves simultaneous introduction of hydrogen and application of voltage. Voltages are expected to be high (10-20 kilovolts) while current is small (on the order of microamperes ($\mu$As) dictating a low overall power. As demand increases, the capacitor is further discharged, releasing additional hydrogen. During deceleration, voltage from regenerative braking and hydrogen from the fuel cell are used to recharge the capacitor. The reestablishment of strong electric fields (which may also require drawing some charge from a high voltage capacitor) binds the available hydrogen.

The use of the electric field to adjust and enhance adsorption provides higher efficiency, fast cycling and response times, reduced thermal management requirements, lower capital costs, and smaller process footprints. In terms of energy expenditure, "electric field swing adsorption", which is a generally phrase that can be used to describe the method of this invention, applies energy directly to the molecules being separated, concentrated, and/or stored whereas other current state-of-the-art mechanisms (pressure swing adsorption, temperature swing adsorption, and electric swing adsorption) apply the requisite energy across the bulk of the gas phase and adsorbent material. Some energy dissipation to heat can be expected upon executing a charge-discharge cycle, due to dielectric losses.

Besides aspects of this invention that involve gas separation, another aspect of this invention is involved with storage of high value gases such as methane and hydrogen and for gas concentration such as increasing the concentration of carbon dioxide in a combustion power plant flue gas.

Another aspect of this invention is related to a more precise control over the adsorption of a gas compared to the known methods of temperature swing adsorption, pressure swing adsorption, and electric swing adsorption. Gas separation, storage, and concentration by electric field swing adsorption according to this invention is also expected to require less energy than for these other known methods of temperature swing adsorption, pressure swing adsorption, and electric swing adsorption because most of the electric charge used to establish the electric field can be recovered. An electric field can readily be switched on and off, allowing for quick adsorption/desorption cycling. The energy expenditure in the process is also low because energy is concentrated at the point of separation.

The invention may be applicable to any industrial or commercial process involving separation of gases with differing polarizability (i.e. differing response to an applied electric field or differing interaction with a porous substrate subjected to an electric field). This includes, but is not limited to, carbon dioxide separation from biogas or flue gases, separation of nitrogen, separation of carbon dioxide from natural gas, production of pure nitrogen and oxygen from air, cleaning carbon dioxide out of air, and storage of molecular hydrogen or methane. These storage applications could have increasing application in the future as power generation transitions to, alternative energy sources such as wind and solar where storage of energy (in the form of hydrogen) may be required as a load leveler to meet peak demand and fluctuations in demand or production capability. Other applications include capturing or concentrating gases out of air for analysis by sensor platforms such as to facilitate detection of trace toxic components in air.

The following non-limiting examples illustrate the operability of the invention for separating $CO_2$ from a gas mixture using an 11 plate, metal-insulator-metal ("MIM") apparatus consisting of conductive plates with a constant plate spacing. The plates were made of copper and each had a surface area of 6.45 cm$^2$. Plates 1, 3, 5, 7, 9, and 11 were connected to a positive electrode. Plates 2, 4, 6, 8, and 10 were connected to a negative electrode. The insulator material was a solid-state porous dielectric adsorbent material. The MIM apparatus was placed inside a temperature controlled, stainless steel containment vessel having a volume of approximately 622 milliliters and which was equipped with pressure and temperature gauges and with an electric feed-through for the application of a voltage. During an experiment, the stainless steel pressure vessel was evacuated, and then a known amount of analyte gas is introduced. The system was allowed to come to equilibrium, typically over a period of about 6 hours after which time a gas sample was extracted. The composition of the extracted gas was analyzed by gas chromatography. The experiment was then repeated. The stainless steel pressure vessel was reevacuated, after which the same amount of analyte gas was introduced. A DC voltage was then applied across the positive and negative electrodes. The system was allowed to come to equilibrium over a period of approximately 6 hours. Then, a gas sample was extracted and the composition of the gas was analyzed by gas chromatography. The details of the experiments are provided in the EXAMPLES that follow.

EXAMPLE 1

In this EXAMPLE, $CO_2$ was separated from a two-component gas using a metal-organic framework material known in the art as IRMOR-1 in between copper plates spaced apart by 1 millimeter. The initial gas composition was 60% Ar and 40% $CO_2$. The pressure was 20.2 psi. The temperature was 25° C. Three experiments were performed at an applied voltage of 0 volts, and three experiments were performed at an applied voltage of 650 volts. The results are summarized in TABLE 1 below.

TABLE 1

| Experiment | Applied Voltage | Final Ar composition | Final $CO_2$ composition |
|---|---|---|---|
| 1 | 0 volts | 66.37% | 33.63% |
| 2 | 0 volts | 66.38% | 33.62% |
| 3 | 0 volts | 66.38% | 33.62% |
| 4 | 650 volts | 69.55% | 30.45% |
| 5 | 650 volts | 70.61% | 30.29% |
| 6 | 650 volts | 70.14% | 29.86% |

EXAMPLE 2

In this EXAMPLE, $CO_2$ was separated from a three-component gas mixture using the metal-organic framework adsorbent IRMOR-1, which was the same adsorbent used in EXAMPLE 1. The initial gas composition was 11% $CO_2$, 9.96% $O_2$, and 79.04% $N_2$. The plate spacing between the copper plates were 1 mm. The pressure was 20.2 psi and the temperature was 25° C. The results are summarized in TABLE 2 below.

TABLE 2

| Experiment | Applied Voltage | $O_2$ and $N_2$ composition | Final $CO_2$ composition |
|---|---|---|---|
| 1 | 0 volts | 90.67% | 9.33% |
| 2 | 0 volts | 90.73% | 9.27% |
| 3 | 0 volts | 90.70% | 9.30% |
| 4 | 650 volts | 92.98% | 7.02% |
| 5 | 650 volts | 92.92% | 7.08% |
| 6 | 650 volts | 93.01% | 6.99% |

EXAMPLE 3

In this EXAMPLE, $CO_2$ is separated from a two-component gas mixture using a zeolite absorbent, which was Molecular Sieve 5 Å ("Angstrom"). The initial gas composition was approximately 98% $N_2$ and approximately 2% $CO_2$. The spacing between the conductive copper plates was 1 mm. The pressure was 40.0 psi. The temperature was 25° C. The results are shown in TABLE 3 below.

TABLE 3

| Experiment | Applied Voltage | $N_2$ composition | Final $CO_2$ composition |
|---|---|---|---|
| 1 | 0 volts | 98.143% | 1.857% |
| 2 | 0 volts | 98.353% | 1.647% |
| 3 | 0 volts | 98.291% | 1.709% |
| 4 | 500 volts | 97.89% | 2.11% |
| 5 | 500 volts | 98.45% | 1.55% |
| 6 | 500 volts | 98.43% | 1.57% |

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:
1. A method for storing gas, comprising:
preparing an apparatus comprising a porous dielectric adsorbent material in between and in electrical communication with a first electrical conductor and a second electrical conductor, and means for applying an electric field across the porous dielectric adsorbent material,
applying an electric field across the porous dielectric adsorbent material using said means, and
sending gas into the porous dielectric adsorbent material, thereby storing gas in the porous dielectric.

2. The method of claim 1, wherein an amount of gas becomes stored in the porous dielectric adsorbent material that exceeds what is stored therein in the absence of the electric field.

3. The method of claim 1, wherein the first electrical conductor and second electrical conductor comprise a planar geometry.

4. The method of claim 1, wherein the first electrical conductor and the second electrical conductor comprise a nonplanar geometry.

5. The method of claim 4, wherein the nonplanar geometry is selected from concentric cylinders, spheres, and concentric elipsoids.

6. The method of claim 1, wherein the gas comprises a gas mixture.

7. The method of claim 1, wherein the gas is selected from hydrogen, carbon dioxide, oxygen, nitrogen, argon, helium, an organophosphorous ester containing nitrogen, and an organic ester containing nitrogen.

8. The method of claim 1, wherein the gas comprises a hazardous organic chemical.

9. The method of claim 1, wherein the gas is toxic.

10. A method for selectively separating a gas from a mixture of gases, comprising:
    exposing a mixture of gases to an apparatus that comprises a porous dielectric adsorbent material in between and in electrical communication with a first electrical conductor sheet and a second electrical conductor,
    allowing the mixture of gases to diffuse into the porous dielectric adsorbent material, and
    applying a voltage between the first electrical conductor and the second electrical conductor, thereby creating an electric field across the porous dielectric adsorbent material, whereby selective separation of a gas from the mixture of gases occurs.

11. The method claim 10, wherein the first electrical conductor and the second electrical conductor comprise a planar geometry.

12. The method of claim 10, wherein the first electrical conductor and the second electrical conductor comprise a nonplanar geometry.

13. The method of claim 12, wherein the nonplanar geometry is selected from concentric spheres, concentric spheres, and concentric ellipsoids.

14. A method for enhancing the gas storage capacity of a porous dielectric adsorbent material, comprising:
    exposing a porous dielectric adsorbent material to a gas, and
    applying a separate electric field across the porous dielectric adsorbent material in addition to any electric field already present in the porous dielectric adsorbent material, thereby enhancing the gas storage capacity of the porous dielectric adsorbent material.

\* \* \* \* \*